(No Model.) 6 Sheets—Sheet 2.
J. THORNE.
TYPE SETTING AND DISTRIBUTING MACHINE.
No. 372,187. Patented Oct. 25, 1887.
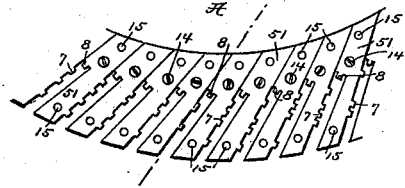
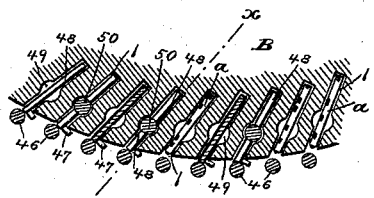
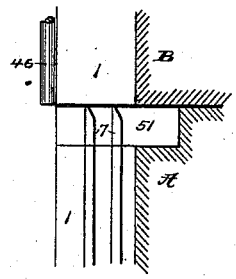
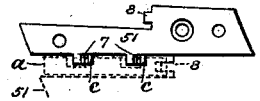
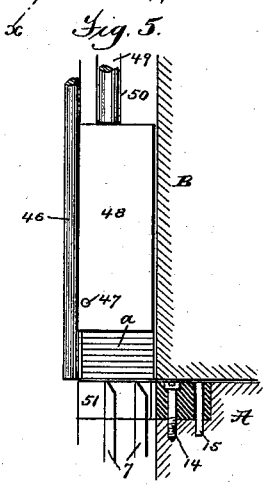
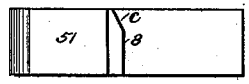
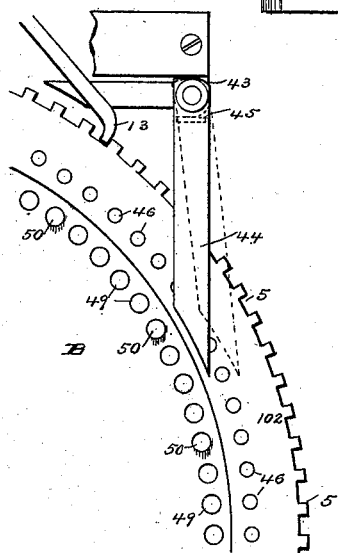
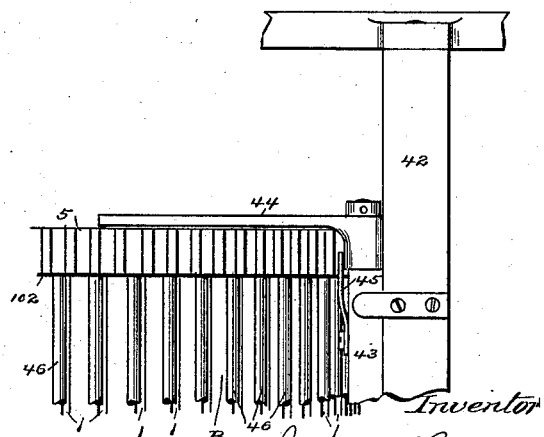
Attest:
Geo. H. Bott.
J. A. Hovey
Inventor
Joseph Thorne
by Munson & Philipp
Attys.
N. PETERS, Photo-Lithographer, Washington, D. C.

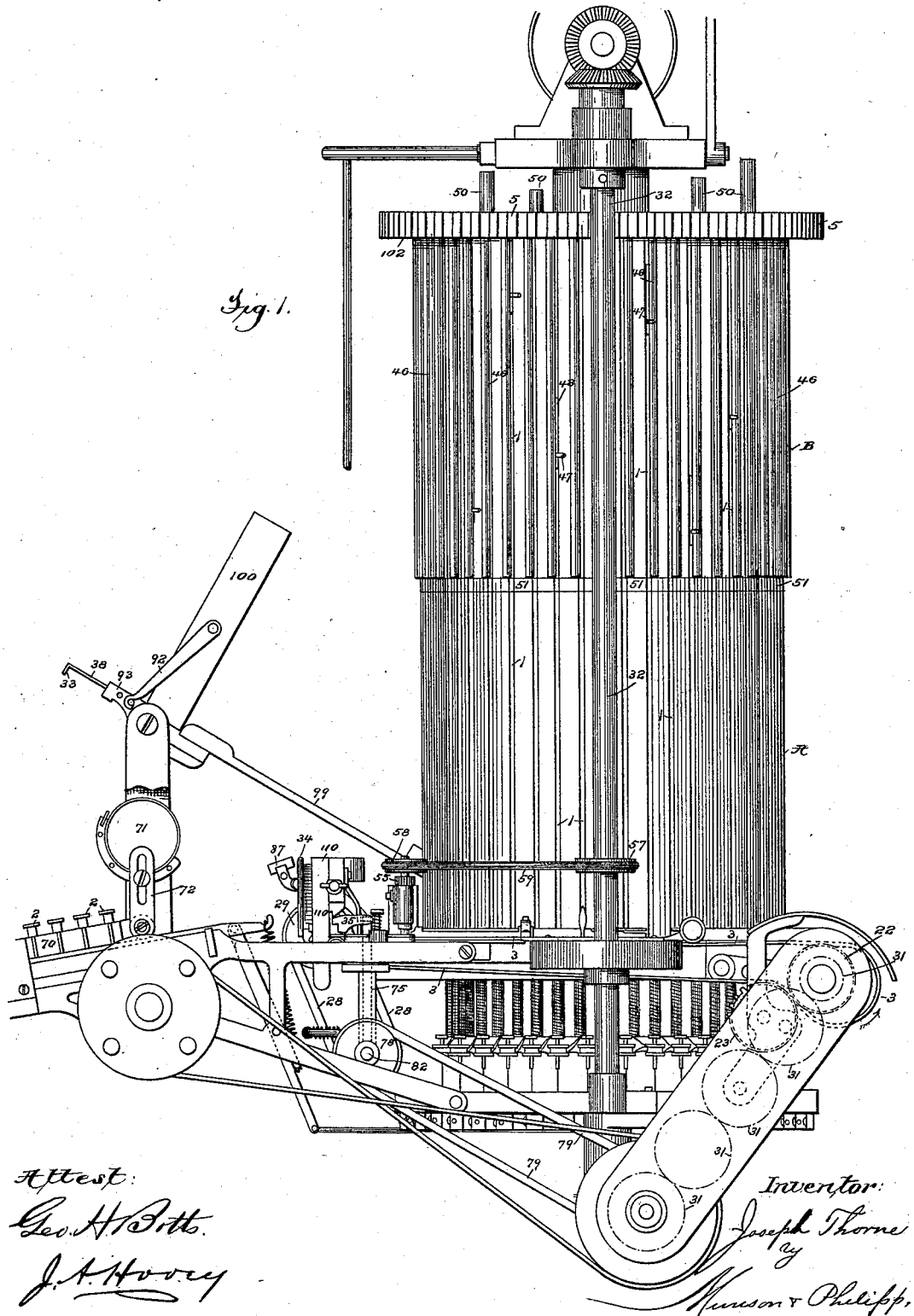

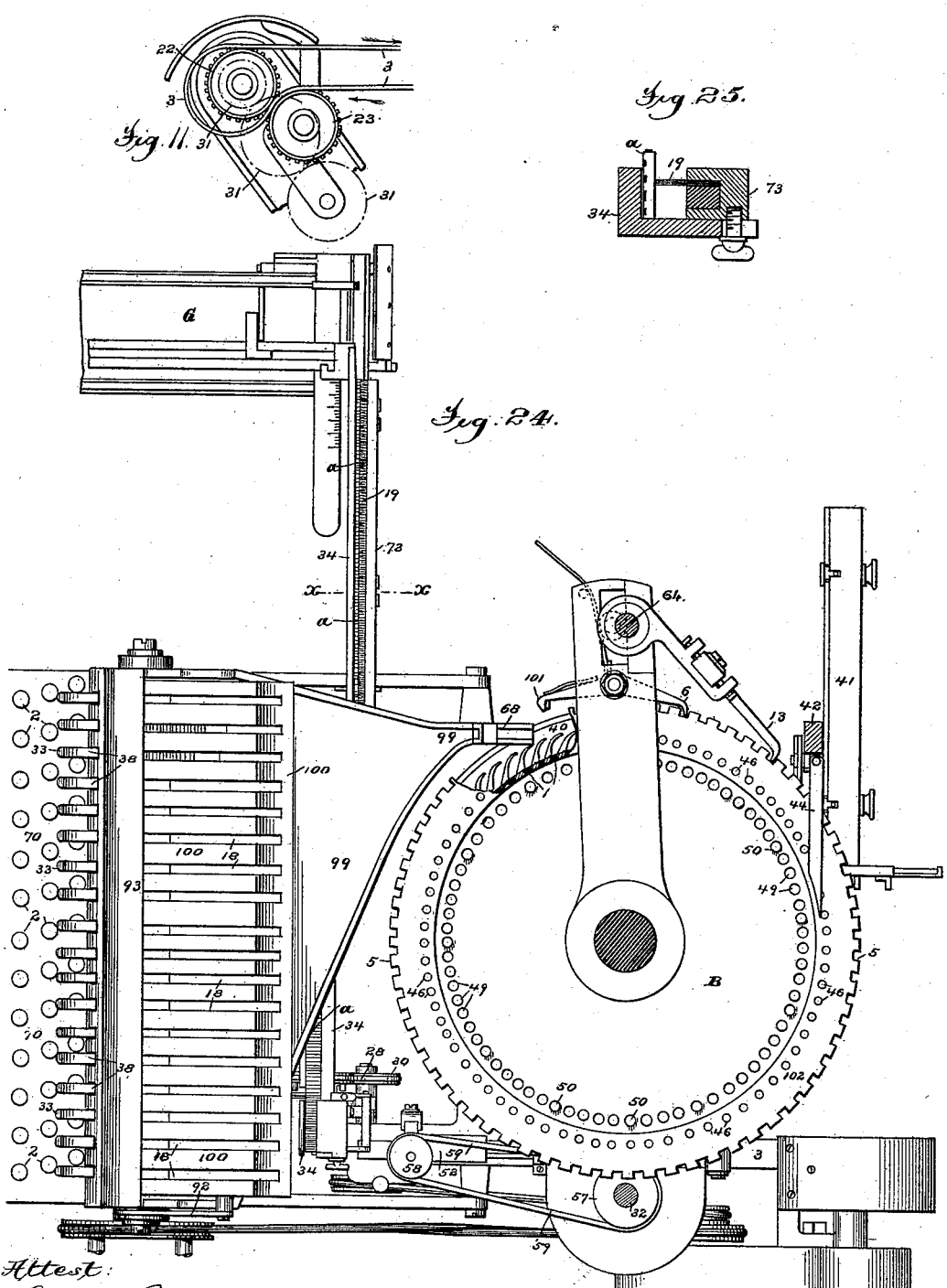

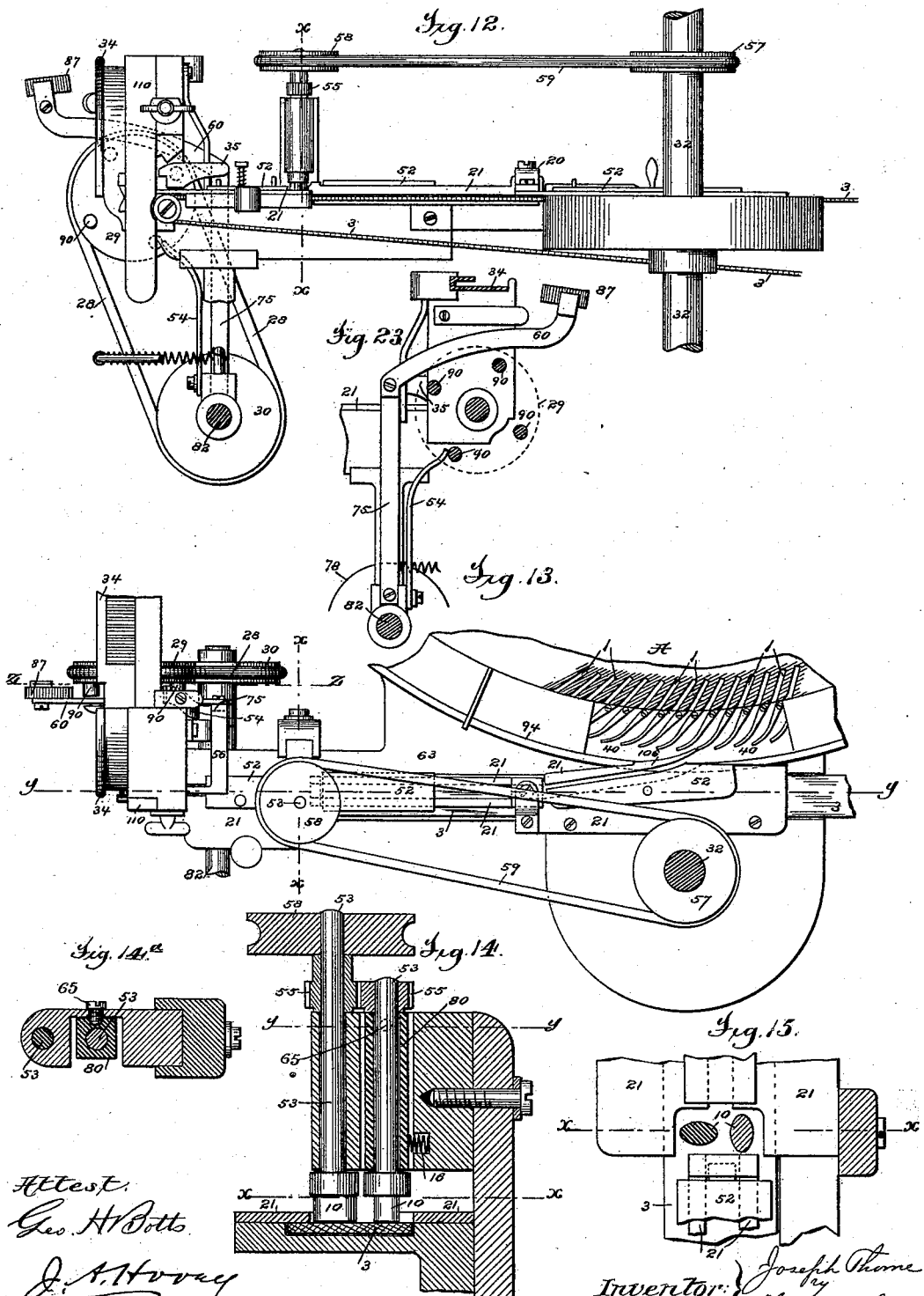

(No Model.) 6 Sheets—Sheet 5.
J. THORNE.
TYPE SETTING AND DISTRIBUTING MACHINE.
No. 372,187. Patented Oct. 25, 1887.
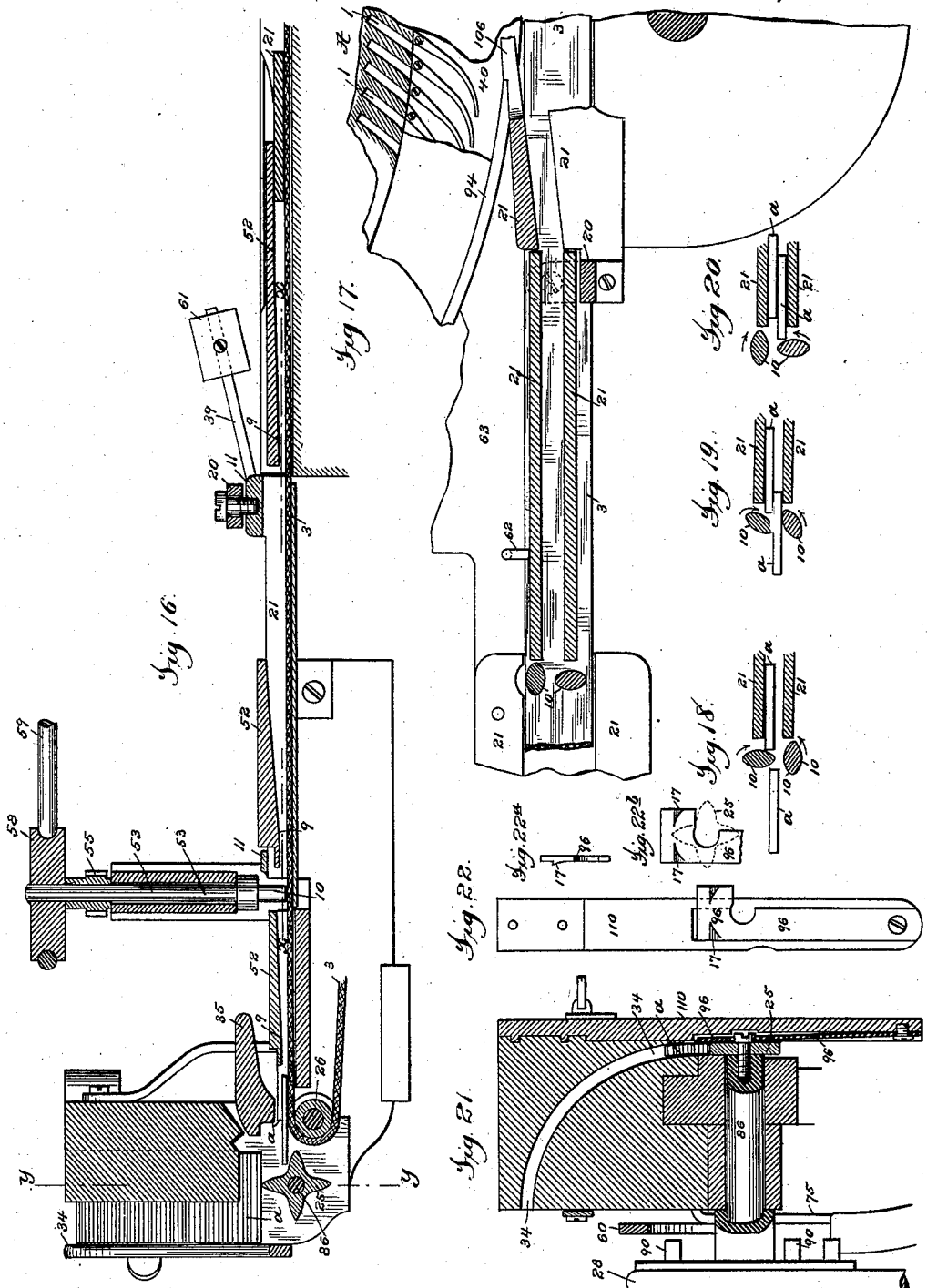

(No Model.) 6 Sheets—Sheet 6.
J. THORNE.
TYPE SETTING AND DISTRIBUTING MACHINE.
No. 372,187. Patented Oct. 25, 1887.
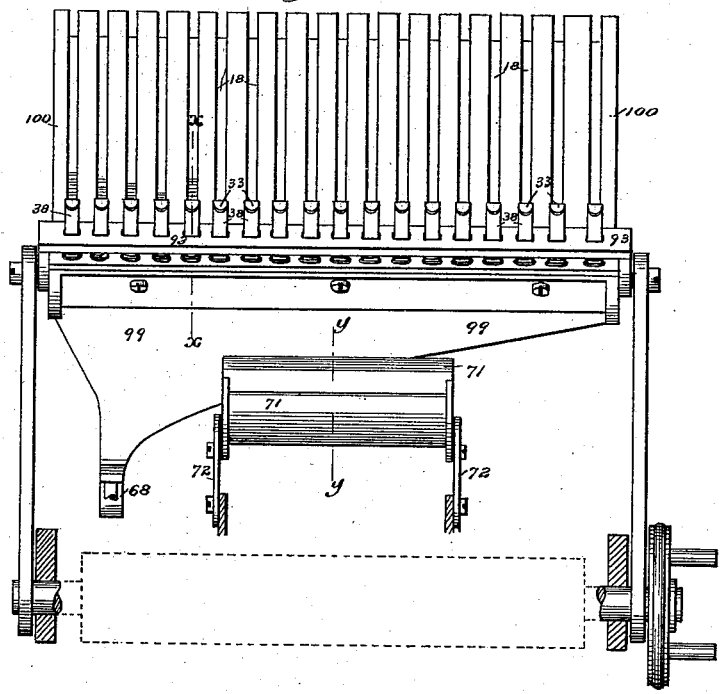
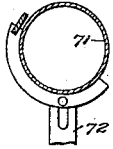
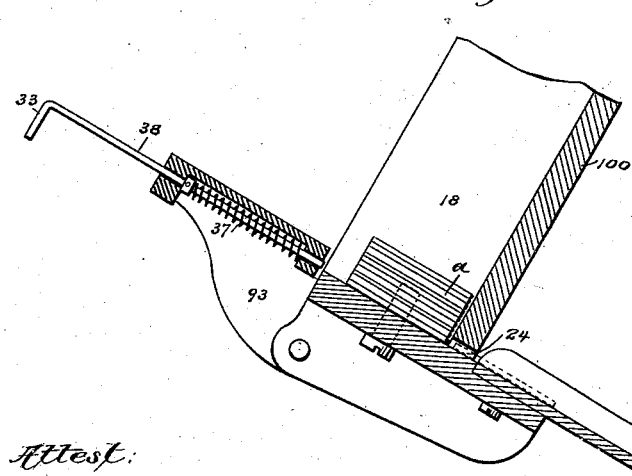
Attest:
Geo. H. Bott.
J. A. Hovey
Inventor:
Joseph Thorne
by
Munson & Philipp
Attys.

UNITED STATES PATENT OFFICE.

JOSEPH THORNE, OF PORT RICHMOND, NEW YORK.

TYPE SETTING AND DISTRIBUTING MACHINE.

SPECIFICATION forming part of Letters Patent No. 372,187, dated October 25, 1887.

Application filed March 17, 1887. Serial No. 231,218. (No model.)

*To all whom it may concern:*

Be it known that I, JOSEPH THORNE, a citizen of the United States, residing at Port Richmond, county of Richmond, and State of New York, have invented certain new and useful Improvements in Type Setting and Distributing Machines, fully described and represented in the following specification and the accompanying drawings, forming a part of the same.

The present invention relates to a type setting and distributing machine of the character shown and described in United States Letters Patent Nos. 232,157 and 283,934, heretofore granted to me, it being the object of the invention to render certain of the mechanisms therein shown more accurate and reliable in their action, and also to add certain details of construction by which the machine as a whole will be improved and its practical efficiency increased.

To this end the invention consists in numerous details of construction, both singly and in various combinations, all of which will be hereinafter fully explained and particularly pointed out.

In order to convey a clear understanding of the various features constituting the present invention, the general construction of the machine in which they are embodied will be first briefly described, reference being had to Figure 1 of the accompanying drawings, which shows in side elevation a type setting and distributing machine of the character referred to when modified according to the present invention. This machine comprises in its organization a type-composing mechanism, the type-case A of which is stationary, and a type-distributing mechanism, the type-case B of which revolves with a step-by-step movement, which mechanisms are capable of operating conjointly or independently of each other—that is to say, the type-composing mechanism may be in operation while the distributing mechanism is at rest, and vice versa, or both mechanisms may be simultaneously in operation. These cases A and B are each provided with vertical type-channels 1, adapted to contain columns of superposed type, from the bottoms of which channels the type are removed in the operations of setting and distributing, the type above falling by gravity as the bottom ones are thus removed. The type-channels in the distributing-case have plain sides, so that they may receive columns of type comprising different letters, such as those constituting words and sentences. The type-channels in the composing-case are provided with wards arranged in such number and position as to give to each channel a distinctive form that corresponds with the shape given to particular type by nicks cut into their bodies, by which arrangement only appropriate type can enter into and descend vertically in the channels of the composing-case. The wards of the channels in the composing-case terminate at a short distance from the bottom of said channels, so as to leave the lower type in the channels free to be removed by ejectors. As before stated, the composing-case A is stationary, while the distributing-case B revolves with a step-by-step movement, its steps being of such length and its driving mechanism so timed that as it rests after each step its type-channels and those of the composing-case will be in alignment, so that any of the bottom type in the channels of the distributing-case, which are thus brought over their appropriate channels in the composing-case, will drop into the same and thus be properly distributed. Each of the type-channels of the composing-case is provided with an ejector, which ejectors are operated through keys 2, so as to eject the type in the proper order to form the desired composition, the place of any type thus ejected being at once filled by the one next above it in the vertical column, which immediately drops to the bottom of the channel upon the withdrawal of the ejector. The type as they are ejected from the channels of the composing-case pass onto a revolving type-carrying table, by which they are deposited on a type-conveying belt, 3, to be conveyed to the line-forming mechanism.

The particular improvements constituting the present invention will now be described with particular reference to the remaining figures of the accompanying drawings, of which—

Fig. 2 is an enlarged side elevation of a portion of the top of the distributing type-case, and Fig. 3 a plan view of the portion of the distributing-case shown in Fig. 2. Fig. 4 is a horizontal section, upon a like scale, of a portion of the distributing-case; and Fig. 5, a vertical section of the lower part of the same, taken on the line $xx$ of Fig. 4. Fig. 6 is a top view, upon a like scale, of a portion of the composing type-case; and Fig. 7, a vertical section of the same, taken on the line $xx$, showing also a portion of the distributing-case in section. Figs. 8, 9, and 10 are still more enlarged views of one of the wear-plates which are inserted in the top of the composing-case, Fig. 8 being a top view, and Figs. 9 and 10 views of opposite sides, Fig. 10 also showing a slight modification, which will be hereinafter explained. Fig. 11 is an inside view of the friction-wheels by which the type-conveying belt is driven. Fig. 12 is an enlarged view of a portion of what is shown in Fig. 1, showing particularly the type-conveying belt and the devices which co-operate therewith to transfer the type from the revolving type-carrying table to the composing-stick. Fig. 13 is a plan view of the parts shown in Fig. 12. Fig. 14 is an enlarged vertical section taken upon the line $x\ x$ of Figs. 12, 13, and 15. Fig. 14$^a$ is a horizontal section taken on the line $y\ y$ of Fig. 14, and Fig. 15 is a similar view taken upon the line $x\ x$ of the same figure. Fig. 16 is an enlarged vertical section taken upon the line $y\ y$ of Fig. 13. Fig. 17 is a horizontal section taken upon the line $x\ x$ of Fig. 16. Figs. 18, 19, and 20 are views illustrating the operation of the devices for causing two type which may happen to overlap each other upon the conveying-belt to take their proper position in line, one behind the other. Fig. 21 is a vertical section taken on the line $y\ y$ of Fig. 16. Fig. 22 is an inside view of the plate carrying the spring supporter by which the type are retained in their raised position after they have been elevated into the end of the composing stick by the lifters. Figs. 22$^a$ and 22$^b$ are enlarged views of a part of the spring supporter. Fig. 23 is a vertical section taken on the line $z\ z$ of Fig. 13, showing particularly the devices for evening up the line of type as it passes into the composing-stick. Fig. 24 is a plan view of the entire machine, showing particularly the auxiliary type-case, which is located above and in rear of the keyboard, and from which the operator can from time to time send such characters into the line as are not provided for in the composing-case. Fig. 25 is an enlarged cross-section of the composing-stick, taken on the line $x\ x$ of Fig. 24. Fig. 26 is a front elevation of the auxiliary type-case just referred to, showing also the copy-holder. Fig. 27 is an enlarged vertical section of the same, taken on the line $x\ x$ of Fig. 26; and Fig. 28 is a cross-section of the copy-holder, taken on the line $y\ y$ of the same figure.

Referring now particularly to Figs. 1 and 24, it is to be understood that the composing type-case A and the distributing type-case B are of substantially the same construction, and operate in substantially the same manner as described in the Letters Patent before referred to. The step-by-step motion is imparted to the distributing-case by means of pawls 13, 6, and 101, which engage with a ratchet, 5, formed on a projecting rim, 102, at the top of the distributing-case, and are driven by means of eccentrics formed on a driven shaft, 64. These pawls are so moved by means of their eccentrics that the pawl 6 operates to move the distributing-case quite rapidly through the first and greater part of each step of its movement, the pawl 13 then operating to move the case through the remainder of each step, but at a reduced rate of speed. The pawl 101 is arranged so that when thrown into operation it will give an additional half-step movement to the distributing-case and allow it to come to rest with the lower ends of its type-channels 1 directly above the solid portions of the composing-case. This mechanism forms no part of the present invention, it being claimed in an application filed by me June 4, 1885, Serial No. 167,599. The type-channels 1 of the distributing-case are provided with fenders 46, which are suspended in openings formed in the rim 102 at the top of the case and extend downward in front of the channels, their function being to prevent the type from moving or being thrown outward in the channels. These fenders are capable of being moved upward through the openings in the rim 102, so as to be removed from in front of the channels when the latter are to be filled with the lines of type to be distributed. For the purpose of removing the fenders from in front of the type-channels when the latter are to be filled, the bar 42, (see Figs. 2, 3, and 24,) which supports the rest 41 for the galley from which the type are inserted into the channels of the distributing-case, is provided with a sliding bar, 43, having an arm which is arranged to engage with the lower end of the fender of each channel as the channels are brought successively into position to be filled, and which, as the bar 43 is moved upward, raises the fender out of position in front of the channel. After each channel has been filled the bar 43 is moved downward to its normal position, thereby allowing the fender to move downward to its proper position in front of the channel, and so the operation is repeated as each channel is filled.

In the organization shown in my prior Letters Patent no means were provided for restoring the fenders to their normal position in front of the type-channels after they had been raised, gravity alone being depended upon for this purpose. It has been found in practice, however, that sometimes the fenders will stick or bind in the openings in the rim 102, particularly if they have become slightly bent, so that after having been raised, as just stated, they will not, upon the downward movement of the bar 43, restore themselves to their proper position. It is therefore desirable to provide means by which the fenders will be positively moved back to their proper position after they have been raised. For this purpose I extend the bar 43 upward to the top of the distributing-case and provide it with a lateral arm, 44, which projects over the rim 102, directly above the upper end of any fender which is in position to be raised by the arm upon the lower end of the bar 43. By this means whenever any one of the fenders is raised by the upward movement of the bar 43 it is again positively restored to its normal position by the arm 44 upon the downward movement of the bar 43. The fenders are, however, sometimes raised by the attendant for other purposes than the insertion of lines of type into the channels of the distributing-case, and in such case it might happen that when one of the fenders had been so raised the attendant would fail to restore it to its proper position, and thus leave it so that its upper end would project slightly above the rim 102. In such case the projecting end would, as the distributing-case was revolved, finally come into contact with the arm 44, and thus either lock the machine or cause breakage or injury to some of the parts. To avoid this the arm 44 is pivoted so as to have a lateral movement upon the arm 43, and is provided with a spring, 45, the tendency of which is to hold it in its proper position above the ends of the fenders, as shown by full lines in Fig. 3. If, however, at any time one of the fenders should project above the rim 102, and thus come into contact with the arm 44, the arm will readily yield, as indicated by dotted lines in said figure, so as to allow the fender to pass without stoppage or injury to the machine, and immediately upon the passage of the projecting fender the spring will restore the arm to its proper position.

In the organization shown in the Letters Patent referred to each of the channels of the distributing-case was provided with a follower, 48, (see Figs. 1, 4, and 5,) which was of considerable weight and rested upon the top of the line of type $a$ in the channel, and thus aided in forcing the line downward, so that the bottom type of the line would rest upon the top of the composing-case. These followers were provided with studs 47, which were engaged by the same arm on the bar 43 which raised the fenders, so that the follower of any channel was raised upward in the channel at the same time that the fender was removed from in front of the channel to permit the introduction of a new line of type. In the present case the channels of the distributing-case are bored out, so as to provide round openings 49, which extend through the top plate of the distributing-case, as shown in Figs. 3 and 24, and which are adapted to receive round bolts or rods 50, which form auxiliary followers and rest upon the tops of the followers 48. When the channels of the distributing-case are full, or nearly full, the auxiliary followers 50 may be removed, and as the distribution proceeds and the height of the line of type in any channel is decreased so that the weight of the line and the followers 48 is not sufficient to keep it properly pressed downward in the channel the auxiliary followers 50 can be inserted in the openings 49, thus placing still more weight upon the line and causing it to be pressed downward until it is entirely distributed.

In the construction shown in my former Letters Patent the composing-case was made in one piece and the wards at the upper ends of the channels were formed integral with or permanently set into the body of the case. In the present case I provide the upper end of the case around its edge with a recess, in which is seated a series of removable plates or blocks, 51, (see Figs. 1 and 6 to 10,) which, when placed together, form the upper ends of the type-channels of the composing-case and that portion of the case upon which the columns of type in the distributing-case rest and move. These blocks are provided upon their sides with projections 7, forming wards which correspond in number and position to the nicks in the type of the various characters and which determine the proper distribution of the type, and the channels 1 are provided with one or more wards, 7, which register with and form continuations of the wards 7 of the block 51 and act to guide the type downward in the channels and prevent them from being turned or moving out of the channels.

In addition to the wards 7, which enter the nicks in the sides of the type and determine their distribution and guide them downward in the channels, the channels and blocks 51 may be provided with rear wards, 8, which will enter corresponding nicks formed in the bottoms of the type, and thus prevent the thinner type from any liability of becoming turned edgewise in the channels, so as to bind and prevent the downward movement of the line of type. These rear wards, 8, also perform an important function, in that they support the type as they are moved forward over the channels and prevent them from turning so as to drop into the channels before they have arrived squarely above the channels.

The blocks 51 are held in position by means of screws 14 and dowel-pins 15, which permit them to be readily removed and replaced as often as may be required by simply raising the distributing-case slightly off the composing-case. These blocks are made of steel, and, being of small size, can be hardened and ground so as to be formed with perfect accuracy. By this means the upper ends of the type-channels and their wards can be made much more accurately than in the former construction, and the portions of the case which are subject to wear are made much more durable; but, aside from this, the blocks, being removable, can, if they become worn or the wards become broken or damaged, be replaced by new ones without any necessity of taking down the machine or sending any part to the shop for repairs.

The spaces and quads contained in the matter to be distributed, being shorter than the type, may not always when they arrive in position to be distributed have their inner ends against the backs of the channels of the distributing-case, and when this happens it would, if means were not provided for preventing it, interfere seriously with the operation of distributing, because when a space or quad was thus moved outward from the back of the channel its nicks would not be in position to register with the wards of the proper channel in the composing-case, and it would fail to be distributed, and would thus prevent the distribution of any type from the line above it in the channel. To overcome this the nicks in the spaces and quads have been made of a width equal to the width of the wards with which they are to register, plus the difference between the length of a type and a space or quad, so that if a space or quad moves outward until it is even with the faces of the type in the line or any part of this distance its nicks will still be in position to receive the wards of the appropriate channel, so that it will not upon arriving at its channel fail to be distributed. This widening of the nicks in the spaces and quads, while it made it certain that they would be distributed when they arrived at the proper channels of the composing-case, permitted them to enter and pass downward in said channels with their inner ends so far outward from the backs of the channels that the wards 8 on the backs of the channels would not enter the nicks in their ends. This to a great extent destroyed the function of the wards 8, so far as the spaces and quads were concerned, and permitted them, and more particularly the thinner spaces, to sometimes turn and wedge in the channels. To overcome this difficulty the nicks in the spaces and quads are in the present case made of the same width as before, and the wards 7 of the channels which are to receive the spaces and quads are made of an equal width up to within a short distance of their upper ends. From this point, however, the wards are beveled or inclined upon their inner sides, as best shown in Figs. 8 and 9, so that at their extreme upper ends they are reduced in width. From this construction it results that if a space or quad is moved outward in a channel of the distributing-case so as to be even with the outer ends or faces of the type, as indicated by dotted lines in Figs. 8 and 9, its nicks will still be in position to receive the upper ends of the wards 7, so that it will be distributed. As soon, however, as the space or quad commences to descend in its channel in the composing-case, the inclines $c$, acting against the sides of the nicks, will force the space or quad inward to the back of the channel, so that the ward 8 will enter the nick in its end, as indicated by dotted lines in Fig. 9. The same result may be accomplished by making the wards 7 of the ordinary width, and without the inclines $c$ at their upper ends, and forming the back wards, 8, so that they will project into the channels a distance equal to the depth of the nicks in the ends of the quads and spaces plus the difference in length between the type and the quads and spaces, and providing the inclines $c$ at their upper ends, as shown in Fig. 10. The operation will then be reversed. If a quad or space has moved outward, the nick in its inner end will still be in position to receive the ward 8, while if it is in its normal position the incline $c$ upon the ward 8 will force it outward to a position even with the faces of the type. It is preferable, however, to provide the inclines $c$ upon the wards 4, as first described. The wards 4 or 8 of the channels which receive the type from the distributing-case need not of course be provided with the inclines $c$, as the type are prevented by the fenders 46 from moving outward from the backs of the channels of the distributing-case.

In the organization shown in my prior Letters Patent the type-conveying belt 3 was stretched around a pulley, 26, located at the side of the type-lifter, and another pulley at the rear of the machine, the belt being driven from the main shaft 32 through a countershaft and a train of gears, 31. The belt in the present case is not stretched around its pulleys, but passes loosely around them, and is driven by means of a pulley, 23, (see Figs. 1 and 11,) which is geared to and pinches the belt against the pulley 22, around which the belt passes at the rear of the machine. By this means the belt, instead of being driven by friction, is fed by the pulleys 22 23, and can be left quite slack, so as to retain its normal condition and yet be positively driven, so that the type will be forwarded in proper order.

As the type are successively ejected from the composing-case they are carried around on the revolving type-carrying table 40, and when they arrive at the proper point they are deflected or guided off from the table by a guide, 106, (see Figs. 12 to 20,) and pass onto the type-conveying belt 3, to be conveyed to the lifter 25, the same as in the organization shown in my prior patents, before referred to. The type are maintained in proper position upon the belt by means of side guides, 21, which extend from the rim 94 of the table 40 forward to the lifter. The channel thus formed, through which the type are conveyed by the belt 3, is provided with a removable cover, 52, which is made in sections, as shown, so that it can be more readily removed in case the type should become blocked in the channel and it should be necessary to obtain access to them. The sections of the cover are provided upon their under sides with inclined downward projections 9, as best shown in Fig. 13, which fit between the guides 21 and leave just sufficient space above the belt for the passage of one type of the maximum thickness. By this means any liability of the type to be turned over by the jarring or vibration of the belt is prevented.

In operating the machines as organized in my prior patents it was found that sometimes two type would pass onto the belt 3 in such position as to overlap each other and lie wholly or partly side by side. When this occurred, the type were liable when they arrived at the lifter to become wedged, and thus stop the proper operation of the machine. It was therefore desirable to provide some means by which in case two or more type became overlapped upon the belt they would be restored to their proper position, one behind the other, before they arrived at the lifter. To effect this I provide what may be called a "separator," which operates, in case two or more type are overlapped or partly overlapped upon the belt, to restore them to their proper position in line, one behind the other, before they are permitted to pass to the lifter. This device consists of a pair of oval-shaped rolls, 10, which are located directly above the belt 3 at a point near the lifter. These rolls are mounted upon vertical shafts 53, which are connected by gears 55, and are driven through a pulley, 57, and belt 58 from a pulley, 59, upon the main shaft 32. These connections are so arranged that the rolls 10 are caused to revolve toward each other, as indicated by the arrows, and the rolls are set upon their shafts so that the lines of their greatest diameters are at right angles to each other, as shown, so that as they revolve the space between them is always about the same, no matter what the position of the rolls. The outer one of the shafts 53 is mounted in a rigid bearing; but the bearing 80 of the inner one of the shafts is pivoted upon a screw, 65, at its upper end, as shown in Fig. 14ª, so as to be capable of a slight oscillating movement to carry the inner one of the rolls 10 to and from the outer one. The bearing 80 is pressed inward by a light spring, 16, which is so adjusted that it will maintain the rolls 10 in such position that they will pinch slightly upon the type as they pass between them. By this means, if two or more type become overlapped upon the belt 3 and arrive in this position at the rolls 10, the action of the rolls, revolving toward each other as they do, will tend to throw the type inward from the guides 21 and cause them to pass through the space between the rolls. This space being only of sufficient width, however, to permit the passage of one type at a time, the other type will be arrested, and only one will pass forward at a time. As soon as the first type has thus passed between the rolls, the second type will immediately be thrown inward toward the opening between the rolls and will pass through in like manner, and so on, one by one. In order to secure this result it is necessary, of course, that the rolls 10 should be comparatively small, as, if they were large, instead of arresting and detaining all of the type except one, they would tend to draw all of the type into their bite or into the space between them, and would thus wedge the type. It is not essential, however, that these rolls should be oval, as shown, although this is the preferable form. The same result will be effected, though not in so perfect a manner, if the rolls are made perfectly round, but of small size. This action of the rolls 10 in throwing the type inward from the guides 21 might in some cases, particularly if more than two type should be overlapped, cause the type at the side of the one which was in position to pass between the rolls to bind against one of the guides and possibly lock the rolls or break the type. To avoid this the guides 21 are made in sections, and the portions of the guides forming the section next in the rear of the rolls 10 are connected together by bridge-pieces 11, and this section is pivoted at its rear end, as shown at 20, so that the forward end of the section is capable of oscillating over the belt. By this means whenever any type is crowded against one of the guides the guides will be moved laterally in either direction, as the case may be, and thus prevent the wedging and crowding of the type. The action of the rolls 10 in bringing the type $a$ into line is illustrated in Figs. 18, 19, and 20. It is desirable that the oscillating movement of the guides 21, which has just been described, should not be affected by the movement of the belt 3, and it is therefore desirable that the guides should not rest or bear upon the belt, but should swing entirely free of the belt. To provide for this the inner one of the guides is provided with a small lateral arm, 62, (see Fig. 17,) which extends inward beyond the edge of the belt 3 and bends downward so that its end rests upon the bed-plate 63. By this means the weight of the guides is taken by the arm 62, and they are kept free from the belt 3. To make the guides yield more readily, however, to any slight pressure from the type on the belt, it is desirable that they should be so nearly balanced as to remove the most of their weight upon the arm 62, and to accomplish this the bridge-piece 11 at the rear end of the guides may be provided with a rearwardly-extending arm, 39, (see Fig. 16,) upon which is mounted an adjustable weight, 61, which can readily be so adjusted as to nearly counterbalance the weight of the guides and thus allow them to oscillate freely on the pivot 20 without bearing but slightly upon the arm 62 at their forward ends. This feature is only shown in Figs. 16 and 17 in order to avoid confusion in the other figures.

The lifter 25 is of the construction described in my prior Letters Patent, and is operated by a belt, 28, which passes around a pulley, 29, upon the shaft 86 of the lifter and around a pulley, 30, on a counter-shaft, 82, and which is driven through a belt, 79, which passes around a pulley, 78, upon the shaft 82 and a pulley on the shaft through which motion is communicated to the train of gears 31 for driving the belt 3.

In my Letters Patent before referred to, the type, as they are raised by the lifter, are caught and held in their elevated position by a shoulder formed on the inner wall of the composing-stick, the type being pressed onto this shoulder by a pivoted block, which is pressed inward by a spring. In the present case I employ a simple flat spring arranged just outside the lifter and extending above the same in position to press against the lower type of the line as it is raised by the lifter. This spring 96 is fastened at its lower end upon the removable plate 110, which covers the outer face of the lifter, and the spring is arranged so that its upper end extends slightly above the lifter and inwardly (see Figs. 21, 22, 22ª, and 22ᵇ) sufficiently to press and hold the last type in the line against the inner wall of the stick with sufficient force to support the line and relieve the lifter from its weight. The spring 96 will preferably be provided upon its inner face with a slight projection, 17, which will engage with the lower edge of each type as it is raised by the lifter, and thus more positively support the line. The projection or shoulder 17 is cut away at the middle of the spring, as best shown in Fig. 22ᵇ, to accommodate the upper edge of the lifter.

The organization shown in the present case is provided with two strikers, 35 and 87, (see Figs. 12, 13, and 23,) similar to those shown in my prior Letters Patent, and which operate in substantially the same manner to even up the line of type as it passes from the lifter into the composing-stick. These strikers, however, instead of being mounted on separate arms, as in the Letters Patent referred to, are both mounted upon an arm, 75, which is pivoted on the shaft 82, and is operated by a spring-arm, 54, which is connected to the arm 75, and is engaged by studs 90, extending from the outer face of the pulley 29 on the shaft of the lifter. The striker 35 is mounted upon an arm, 56, which extends laterally from the upper end of the arm 75, and the striker 87 is mounted upon a second arm, 60, which extends forward from the arm 75 and passes beneath the composing-stick. As the type a are raised by the lifter they pass into the composing-stick 34 (see Figs. 16, 21, and 24) and are gradually moved forward in the stick as the successive type are added to the line by the lifter. The composing-stick 34 is curved, so as to gradually change the type from the horizontal position in which they enter the stick to a nearly vertical position, and as they arrive at the side of the machine in this position they are taken by the justifier and formed into lines and introduced into the galley G. The galley G and its auxiliaries for effecting the justification and making up the matter into columns, &c., form no part of the present invention, as the same is claimed in my application filed June 4, 1885, Serial No. 167,600.

As the type are brought into a vertical or nearly vertical position and moved along the stick in that position, the forward type of the line are liable to fall over into the bottom of the stick, and thus become misplaced. To prevent this the stick is made somewhat wider than the thickness of a type, (see Figs. 24 and 25,) and is provided with an adjustable back, 73, in which is clamped a row of bristles or a narrow strip of hair-cloth, 19, or other similar material, which bears against the side of the line of type with a gentle pressure sufficient to prevent the forward type of the line from falling, and thus maintains them in their upright position until they are removed from the stick by the justifier.

In my prior Letters Patent I have shown a chute, 68, which leads from a point in convenient proximity to the operator to the revolving type-carrying table 40, by which the operator can from time to time place upon the table, and thus introduce into the line, such type as are not provided for in the composing-case of the machine. To do this, however, was inconvenient, as the operator was obliged to first take the required type from a case and turn them into the proper position before placing them in the chute. To obviate this annoyance and delay I provide the machine with an auxiliary type-case, 100, (see Figs. 1, 24, 26, and 27,) which is located above the inner edge of the key-board 70, and is provided with a series of type-channels, 18, in which the odd sorts of type which are not provided for in the machine are placed. Each of the channels 18 of this auxiliary case is provided at its bottom and at its rear or inner side with an opening, 24, of sufficient size to permit the passage of a single type of the size contained in the channel. Located in the rear of this type-case, and just below the openings 24, is an apron, 99, which inclines downward with gradually-converging sides, which terminate at the upper end of the chute 68, so that any type ejected from one of the channels 18 will pass onto the apron 99, and thence, by gravity, downward along the apron and be directed into the chute 68, from which it will pass onto the table 40 and be conveyed to the belt 3 and take its proper place in line.

The front side of the case 100 is provided with a series of plungers, 38, which are arranged to enter the bottom of the channels, so as to eject the bottom type of any channel onto the apron 99. These plungers are provided with springs 37, by which they are normally held withdrawn from the channels 18, and are provided at their outer ends with suitable keys or handles, 33, by which they can be pressed inward, so as to eject a type when required. These plungers are supported in a pivoted frame, 93, which is held in its raised position by hooks 92, so that whenever desired the frame and the plungers can be swung downward away from in front of the type-channels, and thus allow access to the bottoms of the channels for any purpose that may be required. This auxiliary type-case, with its plungers for ejecting the type therefrom, is in such relation to the operator that the type contained in the channels 18 can be introduced into the line with nearly or quite the same rapidity that the ordinary types can be, and thus the extra delay occasioned by the necessity of introducing type not contained in the composing-case of the machine is nearly or quite avoided.

In machines of this class it has also been found desirable that the copy-holder for holding the copy for the operator should be made adjustable, as different operators, in order to work with the greatest ease and rapidity, require the copy to be in different positions. The copy-holder 71 shown in the present case (see Figs. 1, 26, and 28) is in its general construction substantially the same as that shown in my prior Letters Patent. Instead, however, of being rigidly mounted, as shown in said patent, it is supported by screws which pass through slotted arms 72 in such way that the height of the holder can be readily adjusted, and the arms 72 are pivotally secured to the key-board by means of set-screws, so that the holder when adjusted to the proper height can be readily moved to or from the operator and then secured in position. By this means the copy-holder can be adjusted to such position as to suit the requirements of almost any operator, and this is a feature of considerable convenience and importance in the practical operation of the machine.

What I claim is—

1. The combination, with the distributing-case B, its fenders 46, and the sliding bar 43, for raising the fenders, of the arm 44, extending over the top of the case, for restoring the fenders to their proper position, substantially as described.

2. The combination, with the distributing-case B, its fenders 46, and the sliding bar 43, for raising the fenders, of the arm 44, pivoted to the bar 43 and provided with the spring 45, for restoring the fenders to their proper position, substantially as described.

3. The combination, with the distributing-case B, of the composing-case A, provided with type-channels having side wards, 7, and a back ward, 8, one or more of said wards having an incline, c, at its upper end, substantially as described.

4. The combination, with the composing-case and its type channels having back wards, 8, of the side wards, 7, having the inclines c at their upper ends, substantially as described.

5. The combination, in a type-setting machine, of a type-conveying belt, side guides, 21, for holding the type on the belt, and a pair of rolls, 10, arranged above the belt and projecting inside of the guides and revolving toward each other, so as to draw the type between them one at a time, substantially as described.

6. The combination, with the belt 3, of the oval-shaped rolls 10, having their axes parallel and their greater diameters set at right angles to each other and arranged to draw the type between them one at a time, substantially as described.

7. The combination, in a type-setting machine, of a type-conveying belt, the oscillating side guides, 21, for holding the type on the belt, and a pair of rolls, 10, arranged above the belt and projecting inside of the guides and revolving toward each other, so as to draw the type between them one at a time, substantially as described.

8. The combination, with a type-conveying belt, of the rolls 10, one of which is supported in a yielding bearing, and the spring 16, acting upon said bearing, substantially as described.

9. The combination, with a type-conveying belt, of the pivoted oscillating guides 21 and the counterbalance-weight 61, substantially as described.

10. The combination, with a type-conveying belt, of the pivoted oscillating guides 21, having the supporting-arm 62 and the counterbalance-weight 61, substantially as described.

11. The combination, with the belt 3 and guides 21, of the covers 52, having the downward projections 9, substantially as described.

12. The combination, with the composing-stick 34, having the adjustable back 73, of the yielding support 19, carried by the back and arranged to bear against the side of the line of type in the stick, substantially as described.

13. The combination, with the type-case 100, having the type-channels 18, of the swinging frame 93, provided with the plungers 38, moving in the bottoms of said channels to eject the type therefrom, substantially as described.

14. The combination, with the key-board 70, of the copy-holder 71, vertically adjustable in the pivoted arms 72, substantially as described.

In testimony whereof I have hereunto set my hand in the presence of two subscribing witnesses.

JOSEPH THORNE.

Witnesses:
J. A. HOVEY,
J. J. KENNEDY.